United States Patent
Ohta et al.

(10) Patent No.: US 7,525,275 B2
(45) Date of Patent: Apr. 28, 2009

(54) IMPACT ABSORBING MECHANISM OF WALKING ROBOT

(75) Inventors: Shigehiko Ohta, Tokyo (JP); Toshikazu Kawasaki, Tokyo (JP); Takakatsu Isozumi, Tokyo (JP)

(73) Assignee: Kawada Industries, Tokyo (JP)

( * ) Notice: Subject to any disclaimer, the term of this patent is extended or adjusted under 35 U.S.C. 154(b) by 477 days.

(21) Appl. No.: 10/527,728

(22) PCT Filed: Sep. 10, 2003

(86) PCT No.: PCT/JP03/11586

§ 371 (c)(1),
(2), (4) Date: Oct. 20, 2005

(87) PCT Pub. No.: WO2004/024400

PCT Pub. Date: Mar. 25, 2004

(65) Prior Publication Data

US 2006/0237241 A1    Oct. 26, 2006

(30) Foreign Application Priority Data

Sep. 13, 2002   (JP) ............................. 2002-268966

(51) Int. Cl.
*B25J 5/00* (2006.01)
*G06F 19/00* (2006.01)

(52) U.S. Cl. .................. 318/568.12; 901/1; 901/50; 700/258; 180/8.6; 74/490.09

(58) Field of Classification Search ................ 901/48, 901/50; 267/292; 248/556; 135/82
See application file for complete search history.

(56) References Cited

U.S. PATENT DOCUMENTS 5,255,753 A * 10/1993 Nishikawa et al. .......... 180/8.6

(Continued)

FOREIGN PATENT DOCUMENTS

| JP | 04 175527 | * | 6/1992 |
| JP | 04 175527 A | | 6/1992 |

(Continued)

OTHER PUBLICATIONS

Noriyuki Kanechira, et al., Design and Experiments of Advanced Leg Module(HRP-2L) for Humanoid Robot(HRP-2) Development, Proceedings of IEEE/RS-J Int. Conference on Intelligent Robots and Systems, Oct. 2002.*

(Continued)

*Primary Examiner*—Thomas G Black
*Assistant Examiner*—Lin B Olsen
(74) *Attorney, Agent, or Firm*—Perkins Coie LLP

(57) ABSTRACT

An impact absorbing mechanism, provided to a foot 5 of an extremity of each of two movable legs 2 of a bipedal walking robot 1 having the two movable legs 2, includes: an upper base plate 5-a joined to a foot joint 4 of each of the movable legs 2; a lower base plate 5b positioned below the upper base plate, and being opposite to the upper base plate; and three elastic members 6 anisotropic in terms of elasticity, which are arranged at equal intervals in the circumferential direction about the yaw axis YA extending in a direction perpendicular to the upper base plate 5a, between the upper base plate 5a and the lower base plate 5b, each of which allows the lower base plate 5b to make elastic displacement relative to the upper base plate 5a in the same direction as axis YA extends, while each of which inhibits the lower base plate 5b from making elastic displacement relative to the upper base plate 5a in directions orthogonal to the yaw axis direction, and which join the upper base plate 5a and the lower base plate 5b elastically. This can simplify a calculation by a CPU concerning control of the walking of the walking robot. This can prevent disturbance, which would otherwise occur due to the friction resistance stemming from the physical interference by the rigid members. In addition, this can prevent the 6-axis force sensor from being broken, and can also prevent an equivalent to the breakage.

1 Claim, 5 Drawing Sheets

U.S. PATENT DOCUMENTS

| | | | | | |
|---|---|---|---|---|---|
| 5,416,393 | A | * | 5/1995 | Gomi et al. | 318/568.2 |
| 5,426,586 | A | * | 6/1995 | Ozawa | 701/23 |
| 5,455,497 | A | * | 10/1995 | Hirose et al. | 318/568.12 |
| 6,377,014 | B1 | * | 4/2002 | Gomi et al. | 318/568.12 |
| 6,564,888 | B1 | * | 5/2003 | Gomi et al. | 180/8.6 |
| 6,901,313 | B2 | * | 5/2005 | Mori et al. | 700/245 |
| 7,093,497 | B2 | * | 8/2006 | Takenaka et al. | 73/763 |
| 2005/0120820 | A1 | * | 6/2005 | Takenaka et al. | 74/490 |
| 2005/0230159 | A1 | * | 10/2005 | Maslov et al. | 180/8.1 |
| 2006/0060394 | A1 | * | 3/2006 | Hayakawa et al. | 180/8.5 |
| 2006/0249314 | A1 | * | 11/2006 | Takenaka et al. | 180/8.1 |

FOREIGN PATENT DOCUMENTS

| | | |
|---|---|---|
| JP | 5-293776 A | 11/1993 |
| JP | 11-033941 A | 2/1999 |

OTHER PUBLICATIONS

International Search Report for International Application No. PCT/JP03/11586, Dated Dec. 2, 2003, 2 pages.

Supplementary European Search Report for International Application No. PCT/JP0311586, Dated Nov. 13, 2007 (3 pages).

* cited by examiner

IMPACT ABSORBING MECHANISM OF WALKING ROBOT

FIELD OF THE INVENTION

The present invention relates to an impact absorbing mechanism for improving the stability of a compliance control which is used to control the posture of a walking robot.

BACKGROUND ART

Heretofore, there has been a problem that, during walk of a walking robot having a plurality of movable legs, a leg link mechanism or precision apparatuses, such as sensors, included in the leg link mechanism are apt to be broken due to a touch-down impact caused when the leg link mechanism and the external environment, including the ground and a floor, collide with each other. In order to prevent this problem, some walking robots include, in the foot of the extremities of the movable legs of the robot, an impact absorbing mechanism for absorbing the touch-down impact, for example, which uses rubber bushes with low rigidity and the like.

Some of those walking robots further include a 6-axis force sensor. This sensor is used for control of walk by the walking robots having movable legs, in particular, for compliance control of the foot joints with regard to control of bipedal walking. In the foot of the extremity of each of the movable legs, the sensor is installed between a lower base plate and an upper base plate. The lower base plate has a surface to contact the ground, a floor and the like, and is an equivalent to the foot sole. The upper base plate is joined to the foot joint, and supports the upper structure of the robot including the rest part of the movable leg.

Furthermore, with regard to a compliance control of the foot joints in control of walk of a bipedal walking robot, the 6-axis force sensor measures a reaction force from the lower base plate, which is caused due to a contact of the lower base plate mainly with the ground and the like, as force components respectively in the yaw axis direction (perpendicular direction), the roll axis direction (antero-posterior direction) and the pitch axis direction (left-right direction), as well as moment components respectively about the axes. On the basis of these parameters, a CPU (central processing unit) included in the main body of the robot performs calculations. Thereby, each of the joints in its movable legs is controlled.

At this point, with regard to the foot mechanism provided with elastic members, such as the rubber bushes, constituting the impact absorbing mechanism, the force components and the moments about the axes to be measured by the 6-axis force sensor have the respective deviations due to elastic displacements of the elastic members respectively with regard to the yaw-axis, the roll-axis and the pitch-axis. When the walking of the robot is controlled, this complicates the calculation by the CPU included in the main body of the robot.

If the deviations of the force components in the respective axis directions and the deviations of the moments about the respective axes were kept constant, this can make it simple to control the walking of the robot. To this end, with regard to the elastic displacements in the elastic members which are interposed between the lower base plate and the upper base plate in each of the foot mechanisms for the purpose of impact absorption, it is preferable that the respective rotational spring constants concerning displacements relatively of the base plates be kept constant, and that displacement to maintain the relative positional relationship between the base plates be made isotropic.

More specifically, it is preferable that a walking robot be configured to restrict displacements (deviations) in the axis directions respectively of the lower base plate and the upper base plate, which are inappropriate for controlling of the walking of the robot, by the following measures. In order that elastic displacement with low rigidity due to the impact absorbing mechanism including the rubber bushes and the like may absorb a reaction force from the lower base plate and the load from the upper base plate, including the dead weight of the robot, first, elastic displacement with low rigidity concerning the perpendicular direction (yaw-axis direction) is allowed. Second, concurrently, the elastic displacement has a high rigidity concerning the axis directions orthogonal to the perpendicular direction.

With regard to the walking robot having movable legs, however, when the lower base plate of each of the legs touches down to a slope, the ground in a rough terrain condition or the like, the elastic members, such as the rubber bushes, constituting the impact absorbing mechanism cause disparate elastic displacements which respectively vary in displacement amount with regard to each of the axis directions. For this reason, rotational spring constants respectively of the elastic displacements can not be constant. Accordingly, displacements for maintaining the relative positional relationships between the base plates are hindered from being isotropic.

In addition, while the robot having movable legs is walking, in particular while a bipedal walking robot is walking, when a free leg (a leg in motion, which is not in contact with the ground) is swung forward, this causes a torque about the yaw axis (a moment of rotation) in a supporting leg (a leg being in contact with the ground, and supporting the load including the dead weight of the robot). Accordingly, a large spinning force acts about the yaw axis with the supporting leg working as a center of rotation. This causes the elastic members, such as the rubber bushes, constituting the impact absorbing mechanism to respectively make elastic displacements due to the distortion chiefly about the yaw axis. Concurrently, the elastic displacements respectively about the roll axis (the axis in the antero-posterior direction) and the pitch axis (the axis in the left-right direction), both of which are orthogonal to the yaw axis direction, become so disparate that their displacement amounts differ from each other. As a result, the displacements for maintaining the relative positional relationship between the base plates cannot be isotropic. This complicates the control of the walking of the robot.

In order to restrict such disparate elastic displacements respectively of the elastic members, whose respective displacement amounts vary from one to another, and in order to accordingly make isotropic the relative displacement between the upper base plate and the lower base plate which is an equivalent to a foot sole, it has been essential that a conventional robot be provided with a guide mechanism using rigid members such as plates, which allow the elastic members to make the respective elastic displacements in the yaw axis direction, and which have high rigidity concerning the axis directions orthogonal to the yaw axis direction. This restricts displacements (deviations) in the axis directions between the lower base plate and the upper base plate, which are inappropriate for controlling of the walking of the robot (see Japanese Patent Laid-open No. Hei. 11-033941, Paragraph [0029], and FIG. 1, for example).

However, if the guide mechanism using the rigid members in this manner were installed in the robot, this brings about the following problem. First, the installation increases the weight of the foot mechanism, accordingly increasing the inertial moment, which needs to be suppressed in each of the movable legs of the walking robot. In addition, this installation causes each of the members with high rigidity and a corresponding elastic member to contact each other, accordingly causing frictional resistance. As a result, this frictional resistance, as disturbance, acts on the control of the walking of the robot.

Furthermore, the additional installation of the guide mechanism using the rigid members brings about another problem. The additional installation complicates the foot mechanism. Depending on conditions of the walking posture of the robot, the rigid members interfere physically with the 6-axis force sensor in conjunction with displacement of the elastic members such as the rubber bushes. Accordingly, this breaks the force sensor.

Moreover, with regard to the compliance control, while the 6-axis force sensor measures a reaction force from the lower base plate to be caused due to the lower base plate's contact chiefly with the ground and the like, the impact absorbing mechanism, such as the rubber bushes, for absorbing an impact caused due to the lower base plate's contact with the ground and the like, absorbs the touch-down impact. For this reason, the impact absorbing mechanism is preferable in protecting the robot's joint structures including the sensor devices such as the 6-axis force sensors, and the leg link mechanism. However, the elastic displacements with low rigidity, which are properties of the impact absorbing mechanism, causes vibrations. Accordingly, the vibrations remain during the period of vibration damping. This inadequately vibrates the 6-axis force sensor. As a consequence, the vibration acts, as disturbance, on the control of the walking of the robot.

SUMMARY OF THE INVENTION

An object of the present invention is to provide a mechanism which solves the aforementioned problems advantageously. An impact absorbing mechanism for a walking robot according to the present invention is an impact absorbing mechanism provided to a foot of the extremity of each of a plurality of movable legs of a walking robot having the movable legs. The impact absorbing mechanism is characterized as including an upper base plate joined to a foot joint of each of the movable legs; a lower base plate positioned below the upper base plate, and being opposite to the upper base plate; and at least three elastic members anisotropic in terms of elasticity, which are arranged at equal intervals in the circumferential direction about a predetermined axis line extending in the direction perpendicular to the upper base plate, between the upper base plate and the lower base plate, which allow the lower base plate to make elastic displacement relative to the upper base plate in the same direction as the predetermined axis direction extends, while inhibiting the lower base plate from making elastic displacement relative to the upper base plate in the directions orthogonal to the predetermined axis direction, and which join the upper base plate and the lower base plate elastically.

Such a configuration makes it possible to maintain deviations of the respective force components concerning the axis directions in the foot and deviations of the respective moments about the axes. Specifically, the elastic members arranged between the upper base plate and the lower base plate which is an equivalent to the foot sole in the foot make it possible to keep constant the respective rotational spring constants concerning relative displacement between the base plates. Concurrently, the elastic members make it possible to make isotropic displacement for maintaining the relative positional relationship between the base plates. This enables a calculation by the CPU concerning the control of the walking of the robot to be simplified.

At this point, if only a rotation about the predetermined axis line (the yaw axis) extending in a direction perpendicular to the upper base plate is intended to be restricted, it suffices to arrange two elastic members between the lower base plate and the upper base plate. In a case where the number of elastic members is two, however, the elastic members can not restrict a rotation about one of the two axis lines (the roll axis and the pitch axis), each of which is orthogonal to the predetermined axis line (the yaw axis), and which are orthogonal to each other. By contrast, according to the present invention, at least three elastic members are arranged at equal intervals in the circumferential direction about the predetermined axis line (the yaw axis). These elastic members can allow the lower base plate to make elastic displacement relative to the upper base plate in the same direction as the predetermined axis line (the yaw axis) extends. Concurrently, these elastic members can restrict a rotation of the lower base plate relative to the upper base plate about the axis lines orthogonal to the predetermined axis line (the yaw axis), with regard to the two axis lines (the roll axis and the pitch axis), each of which is orthogonal to the predetermined axis line (the yaw axis), and which are orthogonal to each other, in a equal manner.

In addition, the impact absorbing mechanism according to the present invention does not use the guide mechanism employing rigid members, such as plates, which have been essential for the conventional impact absorbing mechanism between the lower base plate and the upper base plate in each of the feet. The impact absorbing mechanism according to the present invention can be configured to have only elastic members, instead. Accordingly, the very simple configuration can realize the impact absorbing mechanism which is preferable in controlling the walking of the robot. This can prevent disturbance which would otherwise occur due to the friction resistance stemming from the physical interference by the rigid members. In addition, this can prevent the 6-axis force sensor from being broken.

Furthermore, the impact absorbing mechanism does not require the guide mechanism using the rigid members. This decreases the weight of each of the feet, thus enabling the inertial moment acting on the forward swing of each of the movable leg to be reduced. Accordingly, this reduction enables load imposed on each of the joints of the movable leg to be decreased. This makes it possible to improve a speed at which the robot walks, and also makes it possible for the robot to do such as maintain, and recover, the posture promptly.

It should be noted that the impact absorbing mechanism of a walking robot according to the present invention may include at least three high damping members which are arranged at equal intervals in the circumferential direction about the predetermined axis line, between the upper base plate and the lower base plate, and which damp the vibration of the lower base plate relative to the upper base plate. This inclusion can damp the vibration to be caused due to the impact absorbing mechanism in each of the feet effectively and in a short period of time. This makes it possible to inhibit the vibration inadequate for the control of the walking of the robot.

BRIEF DESCRIPTION OF THE DRAWINGS

FIG. 5 is a cross-sectional view taken along the B-B line in FIG. 3a.

FIG. 6 is a cross-sectional view taken along the C-C line in FIG. 3a.

DETAILED DESCRIPTION OF THE PREFERRED EMBODIMENTS

Figure 1:
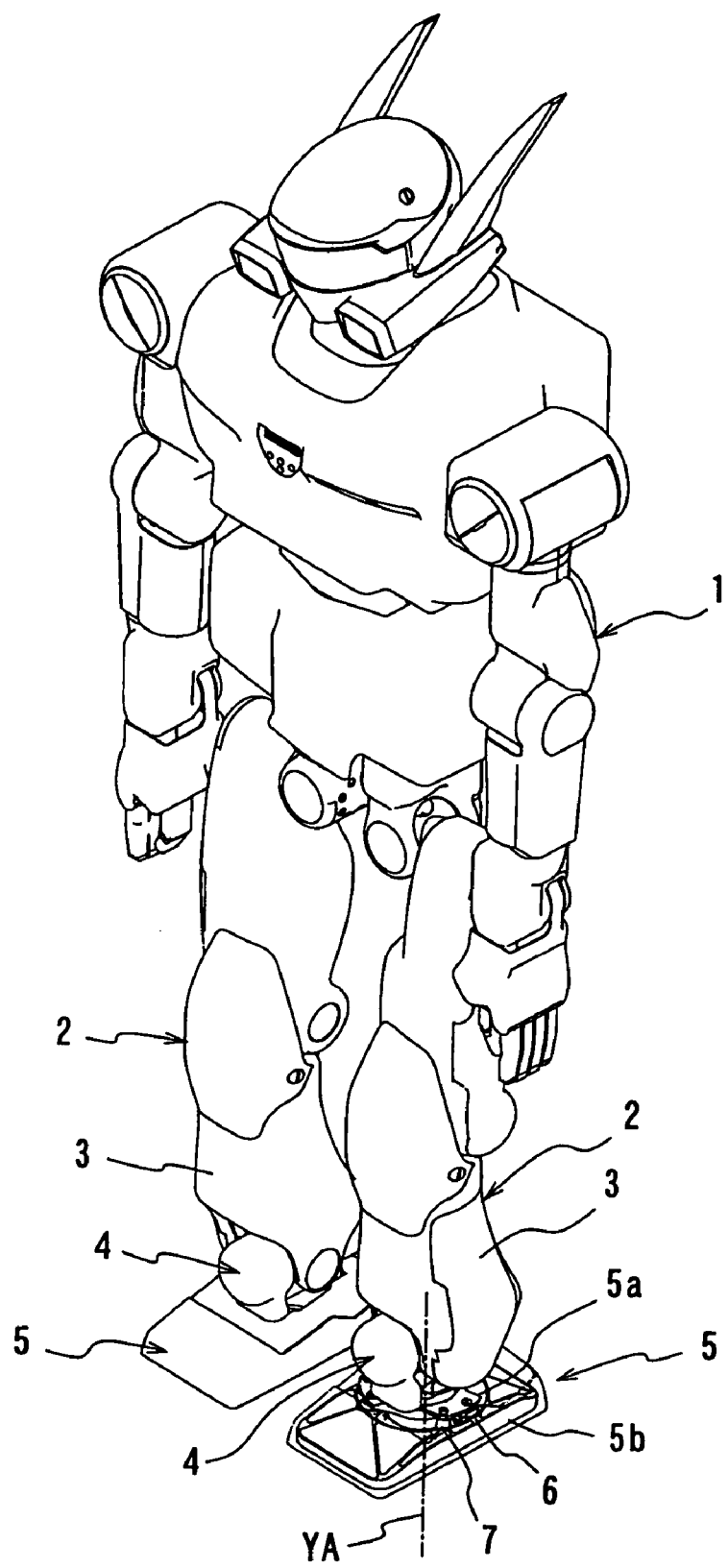
FIG. 1 is a perspective view showing an embodiment of an impact absorbing mechanism of a walking robot according to the present invention, in a state of being seen through, along with other parts of the robot.
Figure 2:
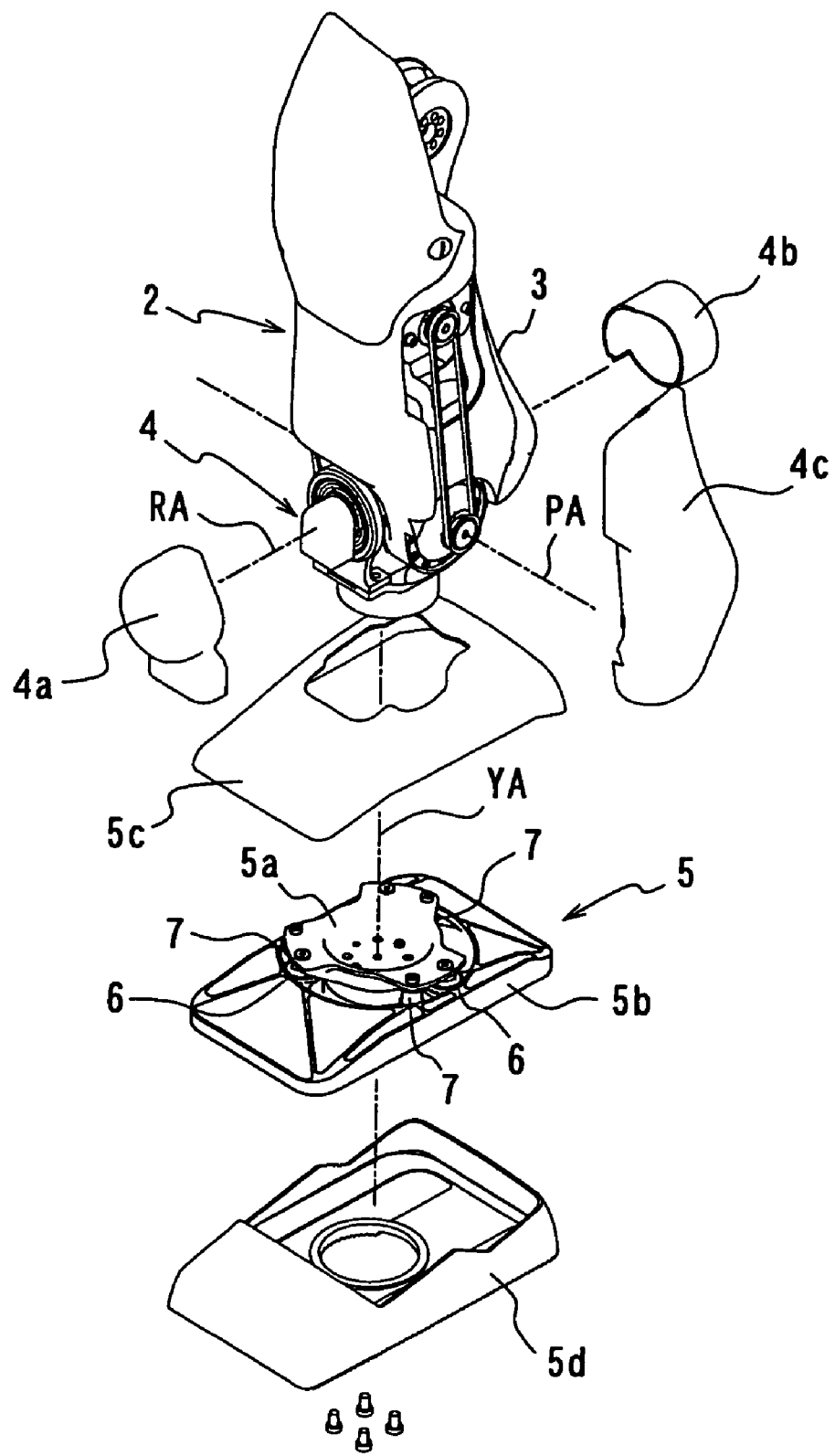
FIG. 2 is an exploded, perspective view showing a foot including the impact absorbing mechanism according to the embodiment, along with a shank of a movable leg and a foot joint of the robot.
Figure 3A:
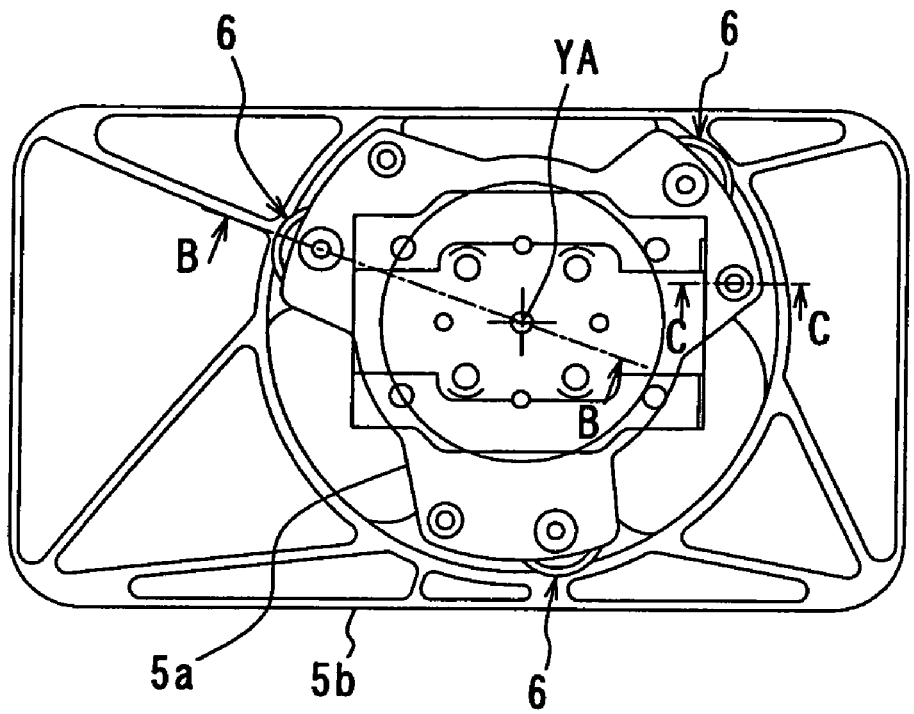
FIGS. 3a and 3b are respectively a plane view and a side view showing the impact absorbing mechanism according to the present invention.
Figure 3B:
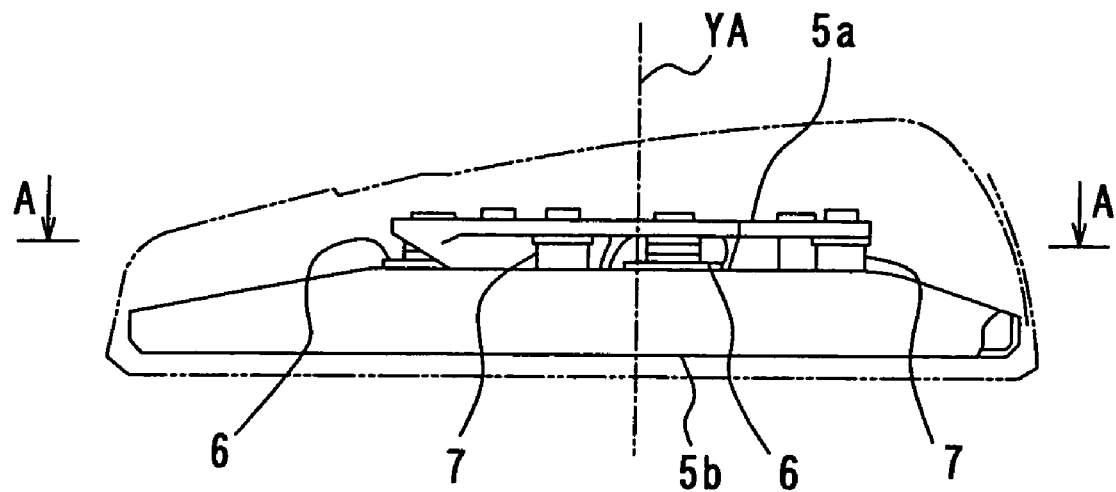
Figure 4:
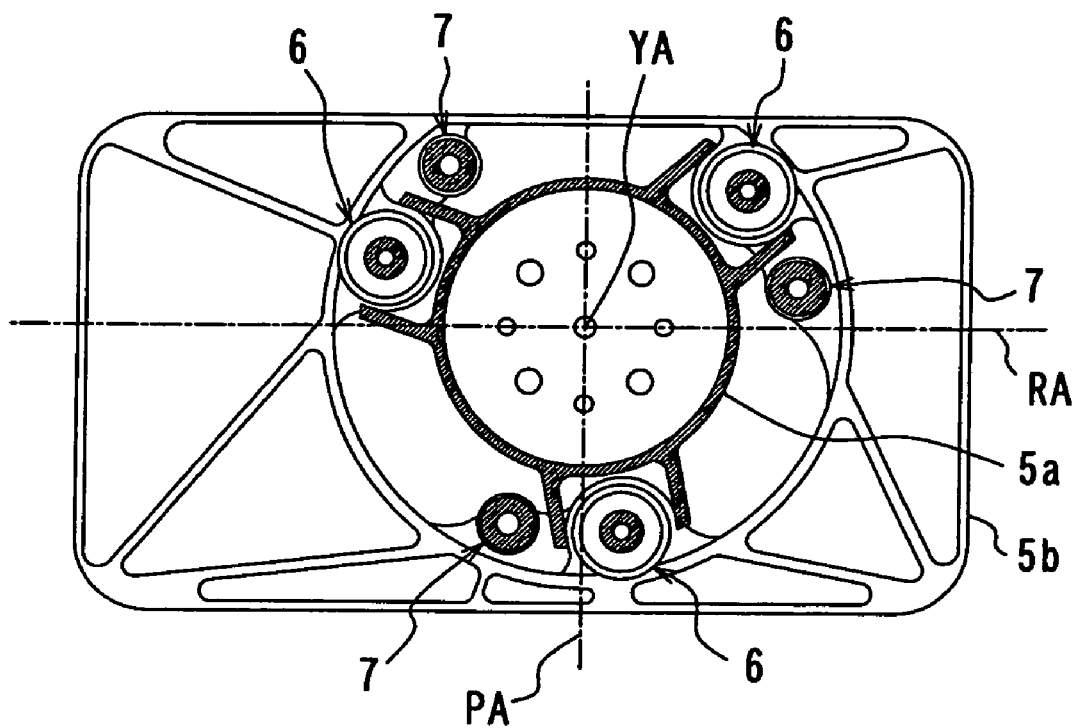
FIG. 4 is a cross-sectional view taken along the A-A line in FIG. 3b.
Figure 5:
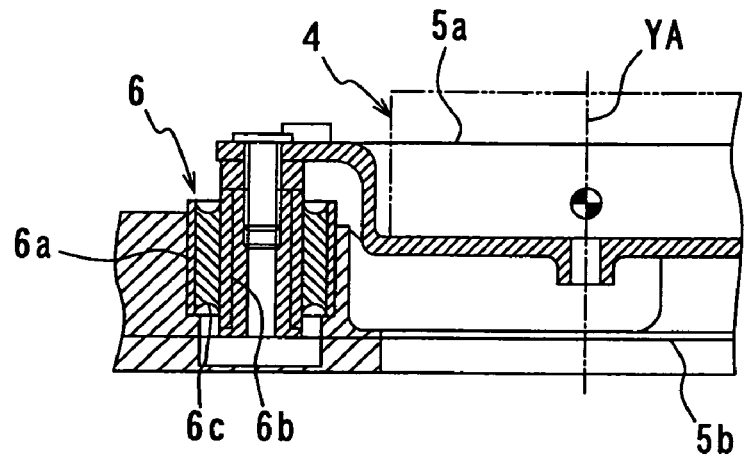
Figure 6:
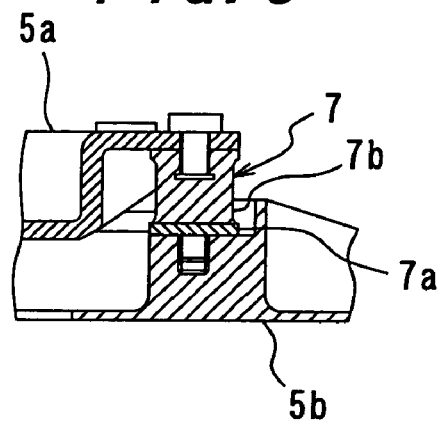
Figure 7:
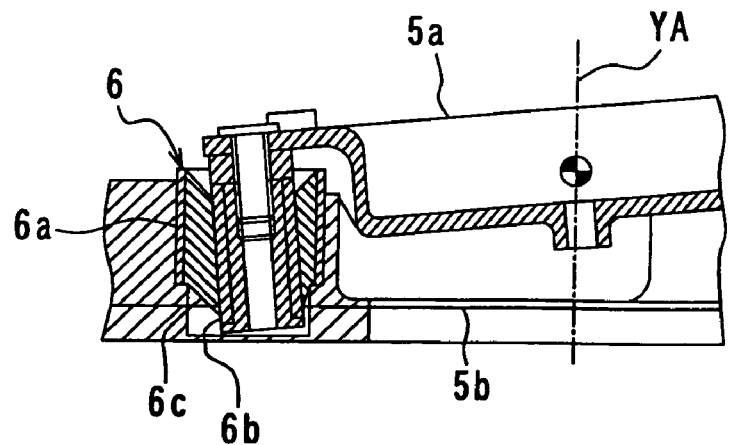
FIG. 7 is an explanatory diagram showing an operational condition of the impact absorbing mechanism according to the present embodiment.

Hereinbelow, descriptions will be provided for an embodiment of the present invention, by use of an example, on the basis of the drawings. FIG. 1 is a perspective view showing an embodiment of an impact absorbing mechanism of a walking robot according to the present invention, in a state of being seen through, along with the other parts of the robot. FIG. 2 is an exploded, perspective view showing a foot including the impact absorbing mechanism according to the embodiment, along with a shank of a movable leg and a foot joint of the robot. FIGS. 3a and 3b are respectively a plane view and a side view showing the impact absorbing mechanism according to the present invention. FIG. 4 is a cross-sectional view taken along the A-A line in FIG. 3b. FIG. 5 is a cross-sectional view taken along the B-B line in FIG. 3a. FIG. 6 is a cross-sectional view taken along the C-C line in FIG. 3a. FIG. 7 is an explanatory diagram showing an operational condition of the impact absorbing mechanism according to the present embodiment.

In the figures, reference numeral 1 denotes a bipedal walking robot; 2, movable legs of the robot; 3, shanks respectively of the movable legs 2; 4, foot joints provided respectively to the extremities (lower ends) of the shanks; 5, feet which are joined respectively to the foot joints 4, and which are rotated relative to the shanks 3 respectively about the yaw axis YA, the roll axis RA and the pitch axis PA in conjunction with operations of the respective foot joints 4; and 4a to 4c, covers for each of the foot joints 4. At this point, each of feet 5 includes: an upper base plate 5a joined to the foot joint 4; a lower base plate 5b which is arranged below the upper plate 5a, and which is opposite to the upper plate 5a; an upper cover 5c; and a lower cover 5d. The yaw axis YA passes through the center of the upper base plate 5a, and extends perpendicularly to the upper base plate 5a. The roll axis RA and the pitch axis PA are orthogonal to the yaw axis YA, and extend respectively in the antero-posterior direction and the left-right direction of each of the movable legs 2.

The impact absorbing mechanism according to the present embodiment, which is provided to such feet 5, includes three elastic members 6 anisotropic in terms of elasticity (for example, "Ultra Bush" which is the name of the product made by NOK Corporation) as follows, in addition to the upper base plate 5a and the lower base plate 5b. The elastic members 6 are arranged, about the yaw axis YA extending in a direction perpendicular to the upper base plate 5a, at equal intervals which keep each neighboring two of the three elastic members 6 separate from each other by an angle of 120° in the circumferential direction. Each of the three elastic members 6 allows the lower base plate 5b to make elastic displacement relative to the upper base plate 5a in the same direction as the yaw axis YA extends. On the other hand, each of the three elastic members 6 inhibits the lower base plate 5b from making elastic displacement relative to the upper base plate 5a in the same directions as the roll axis RA and the pitch axis PA extend, which are orthogonal to the yaw axis YA. In addition, each of the three elastic members 6 elastically joins the upper base plate 5a and the lower base plate 5b together.

As shown in FIG. 5, each of the three elastic members 6 includes an outer cylinder 6a, an inner cylinder 6b, and a rubber-like elastic body 6c which is interposed between the outer cylinder 6a and the inner cylinder 6b, and which are adhered to the outer cylinder 6a and the inner cylinder 6b by vulcanization. Each of the three elastic members becomes similar to a rubber mount. It is rigid in the radius direction, and is soft in the axis direction and the torsional direction. At this point, the outer cylinder 6a is fitted into, and fixed to, the lower base plate 5b. The inner cylinder 6b is fixed to the upper base plate 5a with a bolt.

In addition, as shown in FIG. 6, the impact absorbing mechanism according to the present embodiment includes three high damping members 7 as follows (for embodiment, "High Damping Rubber" which is the name of the product made by NOK Corporation). The three high damping members 7 are arranged about the yaw axis YA at equal intervals which keep each neighboring two of the three high damping members 7 separate from each other by an angle of 120° in the circumferential direction, between the upper base plate 5a and the lower base plate 5b. The three high damping members 7 are respectively adjacent to the three elastic members 6. The three high damping members 7 damp vibration of the lower base plate 5b relative to the upper base plate 5a. Each of the three high damping members 7 includes: a disc-shaped seat plate 7a whose screw shank protrudes downwards; and a rubber-like elastic body 7b, shaped like a cylinder, which is adhered to the upper surface of the seat plate 7a by vulcanization. The rubber-like elastic body 7b of each of the high damping members 7 has a lower degree of elasticity and a higher degree of viscoelasticity than the rubber-like elastic body 6c of each of the elastic members 6. In this case, the seat plate 7a is screwed to, and fixed to, the lower base plate 5b. The rubber-like elastic body 7b is fixed to the upper base plate 5a with a bolt.

The impact absorbing mechanism according to the present embodiment can keep constant deviations respectively of force components in the same directions as the yaw axis YA, the roll axis RA and the pitch axis PA extend, as well as constant deviations respectively of moments about the axes, with regard to each of the feet 5. Specifically, the elastic members 6 arranged between the upper base plate 5a and the lower base plate 5b which is an equivalent to the foot sole in each of the feet 5 make it possible to keep constant the respective rotation spring constants concerning relative displacement between the base plates 5a and 5b. Concurrently, the elastic members 6 can make it possible to make isotropic displacement for maintaining the relative positional relationship between the base plates 5a and 5b. This can simplify a calculation by the CPU concerning the control of the walking of the robot.

In other words, according to the present embodiment, the three elastic members 6 are arranged at equal intervals in the circumferential direction about the yaw axis YA. Accordingly, the impact absorbing mechanism according to the present embodiment can allow the lower base plate 5b to make elastic displacement relative to the upper base plate 5a in the same direction as the yaw axis YA extends. Concurrently, the impact absorbing mechanism can restrict a rotation of the lower base plate 5b relative to the upper base plate 5a about the axis lines orthogonal to the yaw axis YA, with regard to the roll axis RA and the pitch axis PA, each of which is orthogonal to the yaw axis YA, and which are orthogonal to each other, in an equal manner.

In addition, the impact absorbing mechanism according to the present embodiment does not use the guide mechanism employing rigid members, such as plates, which have been essential for the conventional impact absorbing mechanism between the lower base plate and the upper base plate in each of the feet. Accordingly, the impact absorbing mechanism can be configured to have only elastic members 6 and high damping members 7, instead. This very simple configuration can realize the impact absorbing mechanism which is preferable in controlling the walk of the robot. This can prevent disturbance, which would otherwise occur due to the friction resistance stemming from the physical interference by the rigid members. In addition, this can prevent the 6-axis force sensor from being broken, and can also prevent an equivalent to the breakage.

Furthermore, the impact absorbing mechanism according to the present embodiment does not require the guide mechanism using the rigid members. This decreases the weight of each of the feet 5, thus enabling an inertial moment acting on the forward swing of each of the movable legs 2 to be reduced. Accordingly, this reduction enables load imposed on the joints of each of the movable legs 2 to be decreased. This makes it possible to improve a speed at which the walking robot 1 walks, and also makes it possible for the robot 1 to do such as maintain, and recover, the posture promptly.

Additionally, the impact absorbing mechanism according to the present embodiment includes the three high damping members 7, which are arranged at equal intervals in the circumferential direction about the yaw axis YA, between the upper base plate 5a and the lower base plate 5b, and which damp the vibration of the lower base plate 5b relative to the upper base plate 5a. This inclusion can decrease the vibration to be caused due to the impact absorbing mechanism in each of the feet 5 effectively and in a short period of time. This makes it possible to inhibit the vibration inadequate for the control of the walking of the robot.

Hereinbefore, the impact absorbing mechanism has been described on the basis of the illustrated embodiment. However, the present invention should not be limited to the aforementioned embodiment. The configuration and the number of the elastic members 6 and the high damping members 7, for embodiment, can be changed within the scope and the spirit of the descriptions of the claims.

INDUSTRIAL APPLICABILITY

The impact absorbing mechanism for a walking robot according to the present invention can keep constant the deviations respectively of the force components in the axis directions, and the deviations respectively of moments about the axes, with regard to each of the feet. This can simplify the calculation by the CPU concerning control of the walking of the walking robot. In addition, the very simple configuration can realize the impact absorbing mechanism which is preferable in controlling the walk of the robot. This can prevent disturbance, which would otherwise occur due to the friction resistance stemming from the physical interference by the rigid members. In addition, this can prevent the 6-axis force sensor from being broken, and can also prevent an equivalent to the breakage. Furthermore, the load imposed on the joints of each of the movable legs can be decreased. This makes it possible to improve a speed at which the walking robot walks, and also makes it possible for the robot to do such as maintain, and recover, the posture promptly.

The invention claimed is:

1. An impact absorbing mechanism for a walking robot, the impact absorbing mechanism provided to a foot of an extremity of each of a plurality of movable legs of the walking robot having the movable legs, comprising:
    an upper base plate joined to each of the movable legs; a lower base plate positioned directly below the upper base plate, and being opposite to the upper base plate;
    at least three elastic members anisotropic in terms of elasticity, which are arranged at equal intervals in a circumferential direction about a predetermined axis line extending in a direction perpendicular to the upper base plate, between the upper base plate and the lower base plate, each of which allows the lower base plate to make elastic displacement relative to the upper base plate in the same direction as the predetermined axis direction extends, while each of which inhibits the lower base plate from making elastic displacement relative to the upper base plate in directions orthogonal to the predetermined axis direction, and which join the upper base plate and the lower base plate elastically; and
    at least three high damping members which are arranged at equal intervals in a circumferential direction about the predetermined axis line, between the upper base plate and the lower base plate, and which damp vibration of the lower base plate relative to the upper base plate.

* * * * *